(12) United States Patent
Araki et al.

(10) Patent No.: US 11,881,772 B2
(45) Date of Patent: Jan. 23, 2024

(54) POWER SUPPLY DEVICE WITH DISCHARGE CONTROL

(71) Applicant: FUJITSU LIMITED, Kawasaki (JP)

(72) Inventors: Tatsuo Araki, Kawasaki (JP); Susumu Eguchi, Kawasaki (JP); Hironobu Kageyama, Kawasaki (JP); Takashi Satou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 17/679,296

(22) Filed: Feb. 24, 2022

(65) Prior Publication Data

US 2022/0352819 A1 Nov. 3, 2022

(30) Foreign Application Priority Data

Apr. 30, 2021 (JP) .................. 2021-077255

(51) Int. Cl.
*H02M 3/156* (2006.01)

(52) U.S. Cl.
CPC .................. *H02M 3/156* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155;
(Continued)

(56) References Cited

U.S. PATENT DOCUMENTS

| 7,453,711 B2* | 11/2008 | Yanagida | ............... H02M 3/07 |
| | | | 363/59 |
| 8,648,496 B2* | 2/2014 | Carralero | ............ H02M 3/1584 |
| | | | 307/80 |

(Continued)

FOREIGN PATENT DOCUMENTS

| JP | 6-225516 A | 8/1994 |
| JP | 2016-10191 A | 1/2016 |

(Continued)

*Primary Examiner* — Jeffrey A Gblende
(74) *Attorney, Agent, or Firm* — WHDA, LLP

(57) ABSTRACT

A power supply device includes a power supply circuit configured to output different voltages to a plurality of output lines, a plurality of capacitors provided in correspondence with the plurality of output lines, one end of each of the plurality of capacitors being coupled to a corresponding output line of the plurality of output lines and an other end thereof being coupled to a ground potential, a plurality of diodes provided in correspondence with the plurality of output lines, anodes of the plurality of diodes being coupled to the corresponding output lines and cathodes thereof being commonly coupled, and a discharge resistor coupled to the cathodes of the plurality of diodes.

6 Claims, 10 Drawing Sheets

(58) Field of Classification Search
CPC ...... H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H05B 39/048; B23K 11/24; H04B 2215/069
See application file for complete search history.

(56) References Cited

U.S. PATENT DOCUMENTS

| | | | |
|---|---|---|---|
| 8,717,789 B2* | 5/2014 | Tan | H02M 1/4216 |
| | | | 363/65 |
| 9,270,163 B2* | 2/2016 | Shimura | H02J 9/005 |
| 10,971,290 B2* | 4/2021 | Lu | H01F 3/10 |

FOREIGN PATENT DOCUMENTS

| | | | |
|---|---|---|---|
| JP | 2016010191 A | * | 1/2016 |
| JP | 2018-85859 A | | 5/2018 |

* cited by examiner

FIG. 10

| INPUT VOLTAGE Vin | OPERATION OF Comp1 | | | | Q10 | POWER CONSUMPTION OF R1 | CONVERTER |
|---|---|---|---|---|---|---|---|
| | V+ | V- | (V+)-(V-) | Vo | | | |
| 13 V | 12.9 V | 7.9 V | 5.0 V | HIGH | OFF | NO | ON |
| 12 V | 11.9 V | 7.9 V | 4.0 V | HIGH | OFF | NO | ON |
| 8.1 V | 8.0 V | 7.9 V | 0.1 V | HIGH | OFF | NO | ON |
| 7.9 V | 7.8 V | 7.9 V | -0.1 V | LOW | ON | YES | OFF |
| 7.0 V | 6.9 V | 7.0 V | -0.1 V | LOW | ON | YES | OFF |

POWER SUPPLY DEVICE WITH DISCHARGE CONTROL

CROSS-REFERENCE TO RELATED APPLICATION

This application is based upon and claims the benefit of priority of the prior Japanese Patent Application No. 2021-77255, filed on Apr. 30, 2021, the entire contents of which are incorporated herein by reference.

FIELD

The embodiments discussed herein are related to a power supply device.

BACKGROUND

There has been known a power discharge circuit that includes a multi-power supply circuit that individually generates a plurality of voltages and executes discharge processing according to a power-off sequence for a power supply node to be subject to discharge among respective power supply nodes corresponding to the plurality of voltages. In this power discharge circuit, a capacitor is connected to each of the power supply nodes, a discharge circuit is connected to the power supply node having the highest voltage, and a diode is connected between adjacent power supply nodes. When the discharge by the discharge circuit starts at a time of power-off, the discharge of each of the power supply nodes is carried out in descending order of voltage.

Japanese Laid-open Patent Publication No. 2018-85859 is disclosed as related art.

SUMMARY

According to an aspect of the embodiments, a power supply device includes a power supply circuit configured to output different voltages to a plurality of output lines, a plurality of capacitors provided in correspondence with the plurality of output lines, one end of each of the plurality of capacitors being coupled to a corresponding output line of the plurality of output lines and an other end thereof being coupled to a ground potential, a plurality of diodes provided in correspondence with the plurality of output lines, anodes of the plurality of diodes being coupled to the corresponding output lines and cathodes thereof being commonly coupled, and a discharge resistor coupled to the cathodes of the plurality of diodes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating exemplary operation of the power supply device according to the second embodiment.

DESCRIPTION OF EMBODIMENTS

According to a traditional technique, a capacitor connected to a power supply node on a low voltage side is subject to discharge by a discharge circuit connected to the power supply node having the highest voltage via a diode connected to a power supply node on a high voltage side. Accordingly, the capacitor connected to the power supply node having a lower voltage has a larger number of diodes to pass through so that the forward voltage of the diodes accumulates, whereby it becomes difficult to discharge.

Hereinafter, embodiments of a technique related to a power supply device that includes a power supply circuit that outputs different voltages to a plurality of output lines and facilitates discharge of capacitors connected to the respective output lines will be described with reference to the drawings.

Figure 1:
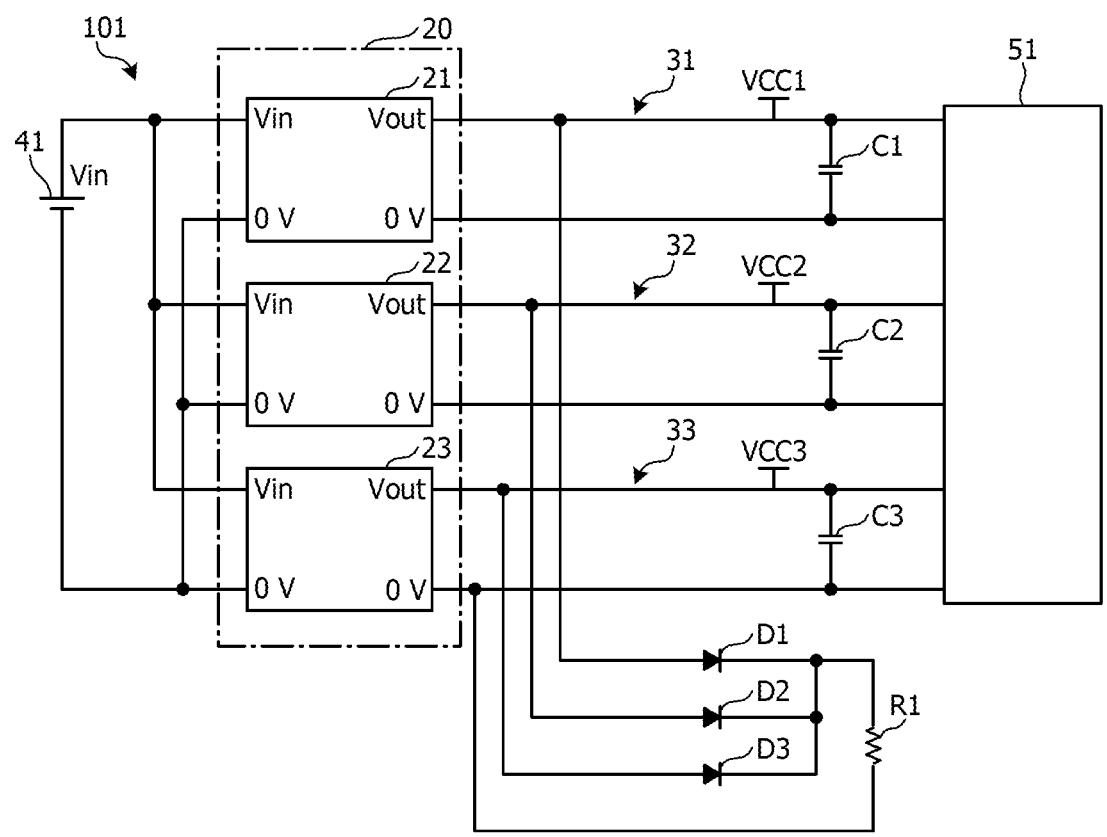
FIG. 1 is a diagram illustrating an exemplary configuration of a power supply device according to a first embodiment.

FIG. 1 is a diagram illustrating an exemplary configuration of a power supply device according to a first embodiment. A power supply device 101 illustrated in FIG. 1 is a circuit that generates a plurality of output voltages Vout (VCC1, VCC2, and VCC3 in this example) having different voltage values, and supplies them to a load 51. VCC3 is smaller than VCC2, and VCC2 is smaller than VCC1. The power supply device 101 is provided in, for example, an electronic device (not illustrated) including the load 51. The power supply device 101 may also be built in or externally attached to the corresponding electronic device.

The electronic device includes the load 51 and the power supply device 101. While specific examples of the electronic device include a supercomputer, a server, a personal computer, a mobile terminal device, and the like, the electronic device is not limited to those devices.

The load 51 operates using the direct current (DC) voltages VCC1, VCC2, and VCC3 generated by the power supply device 101 as a power supply voltage. The load 51 may be a single element, or may be a circuit block including a plurality of elements. The load 51 includes, for example, a first internal circuit that operates using the first voltage VCC1 as a power supply voltage, a second internal circuit that operates using the second voltage VCC2 as a power supply voltage, and a third internal circuit that operates using the third voltage VCC3 as a power supply voltage.

While specific examples of the load 51 include semiconductor devices such as a Field Programmable Gate Array (FPGA), an Application Specific Integrated Circuit (ASIC), a microcomputer, and a memory, the load 51 is not limited thereto.

The power supply device 101 includes a power supply circuit 20, a plurality of capacitors C1, C2, and C3, a plurality of diodes D1, D2, and D3, and a discharge resistor R1.

The power supply circuit 20 outputs the different voltages VCC1, VCC2, and VCC3 to a plurality of output lines 31, 32, and 33, respectively. In the example illustrated in FIG. 1, the power supply circuit 20 includes a plurality of converters 21, 22, and 23 that generate the plurality of voltages VCC1, VCC2, and VCC3 from a common input voltage Vin. The input voltage Vin is supplied from a power source 41. Each of the converters 21, 22, and 23 is an example of a voltage generation circuit that generates voltage.

Each of the converters 21, 22, and 23 may be an integrated circuit including an input terminal to which the common input voltage Vin is input, an output terminal connected to a corresponding output line among the plurality of output lines 31, 32, and 33, and a ground terminal connected to a common ground potential. The converters 21, 22, and 23 may also generate a voltage from different power source input voltages instead of the common input voltage Vin.

The converter 21 converts the input voltage Vin into the DC voltage VCC1, and outputs it to the output line 31. For example, the converter 21 is a DC-DC conversion circuit that converts the DC input voltage Vin into the DC voltage VCC1 and outputs the DC voltage VCC1 to the output line 31. The converter 21 may be a step-down circuit that generates the voltage VCC1 lower than the input voltage Vin, may be a step-up circuit that generates the voltage VCC1 higher than the input voltage Vin, or may be a step-up/down circuit having both step-up and step-down functions. The converter 21 may be a regulator that generates the voltage VCC1 that follows a target voltage value from the input voltage Vin. In a case where the input voltage Vin is an alternate current (AC) voltage, the converter 21 may also be an AC-DC conversion circuit that converts the AC input voltage Vin into the DC output voltage VCC1 and outputs the DC voltage VCC1 to the output line 31.

The converter 22 generates the voltage VCC2 from the input voltage Vin, and outputs the generated voltage VCC2 to the output line 32. The converter 23 generates the voltage VCC3 from the input voltage Vin, and outputs the generated voltage VCC3 to the output line 33. Since the converters 22 and 23 have a configuration same as that of the converter 21, more detailed descriptions of the converters 22 and 23 will be omitted by referring to the above descriptions regarding the converter 21.

The plurality of capacitors C1, C2, and 0 are capacitive elements provided for the corresponding output lines of the plurality of output lines 31, 32, and 33, respectively, and smooth the voltages of the corresponding output lines. The capacitor C1 is an element connected to the output line 31, one end thereof is connected to the output line 31, and the other end thereof is connected to the ground potential. The capacitor C2 is an element connected to the output line 32, one end thereof is connected to the output line 32, and the other end thereof is connected to the ground potential. The capacitor C3 is an element connected to the output line 33, one end thereof is connected to the output line 33, and the other end thereof is connected to the ground potential.

The plurality of diodes D1, D2, and 03 are rectifier elements provided for the corresponding output lines of the plurality of output lines 31, 32, and 33, respectively, and are inserted in series in a path that discharges charges accumulated in the capacitors connected to the corresponding output lines to the discharge resistor R1. The diode D1 has an anode connected to the output line 31 and a cathode connected to one end of the discharge resistor R1. The diode D2 has an anode connected to the output line 32 and a cathode connected to one end of the discharge resistor R1. The diode D3 has an anode connected to the output line 33 and a cathode connected to one end of the discharge resistor R1. Each of the cathodes of the plurality of diodes D1, D2, and D3 is commonly connected to one end of the discharge resistor R1. The plurality of diodes D1, D2, and D3 form a diode-OR circuit.

The discharge resistor R1 is connected to the cathodes of the plurality of diodes D1, D2, and D1 One end of the discharge resistor R1 is commonly connected to the cathodes of the plurality of diodes D1, D2, and D3, and the other end is connected to the ground potential. The discharge resistor R1 may also be formed of one or a plurality of resistance elements depending on the magnitude of the discharge current flowing through the discharge resistor R1.

In the power supply device 101 according to the first embodiment, the discharge resistor R1 is commonly connected to each of the cathodes of the plurality of diodes D1, D2, and D3 connected to the corresponding output lines of the plurality of output lines 31, 32, and 33. Thus, in a case of discharging the charges accumulated in the capacitors C1, C2, and C3 with the discharge resistor R1, each of discharge cutoff voltages of the respective voltages VCC1, VCC2, and VCC3 of the plurality of output lines 31, 32, and 33 becomes a forward voltage VF of each of the diodes D1, D2, and 03 (see FIG. 2). Therefore, the capacitor voltage of each of the capacitors C1, C2, and C3 drops to the discharge cutoff voltage of the forward voltage VF due to the discharge to the discharge resistor R1, whereby the charges accumulated in each of the diode capacitors C1, C2, and C3 are likely to be discharged as compared with a mode illustrated in FIG. 3.

Figure 3:
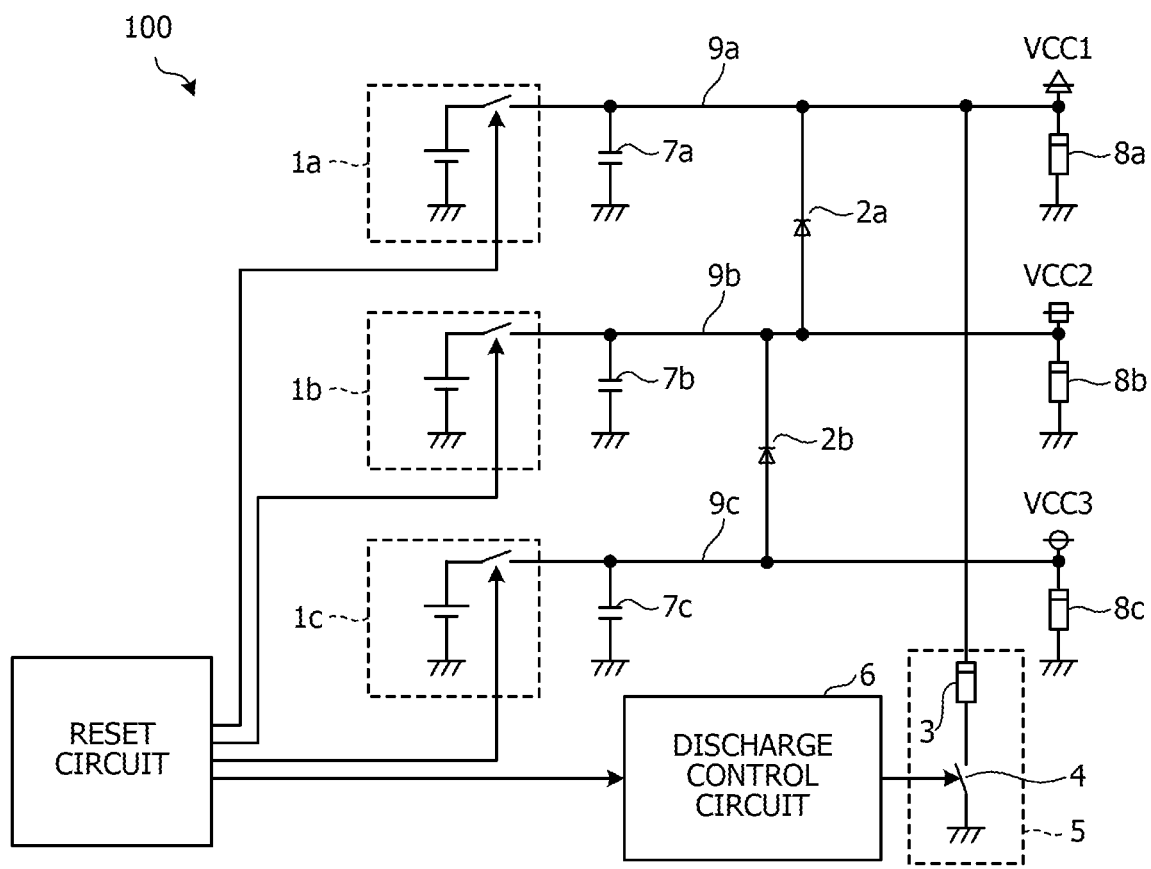
FIG. 3 is a diagram illustrating an exemplary configuration of a power supply device according to a comparative mode.

FIG. 3 is a diagram illustrating an exemplary configuration of a power supply device according to a comparative mode. A power supply device 100 illustrated in FIG. 3 corresponds to the power discharge circuit disclosed in Japanese Laid-open Patent Publication No. 2018-85859. The power supply device 100 includes three power supply circuits 1a, 1b, and 1c. The power supply circuit 1a outputs the voltage VCC1 to an output line 9a, the power supply circuit 1b outputs the voltage VCC2 to an output line 9b, and the power supply circuit 1c outputs the voltage VCC3 to an output line 9c. VCC3 is smaller than VCC2, and VCC2 is smaller than VCC1. A capacitor 7a and a load 8a are connected to the output line 9a, a capacitor 7b and a load 8b are connected to the output line 9b, and a capacitor 7c and a load 8c are connected to the output line 9c. A diode 2a is connected between the output line 9b and the output line 9a, and a diode 2b is connected between the output line 9c and the output line 9b.

A discharge circuit 5 includes a current limiting resistor 3 and a switching element 4. The discharge circuit 5 executes discharge by the switching element 4 switched to a closed state by a discharge control circuit 6.

Figure 4:
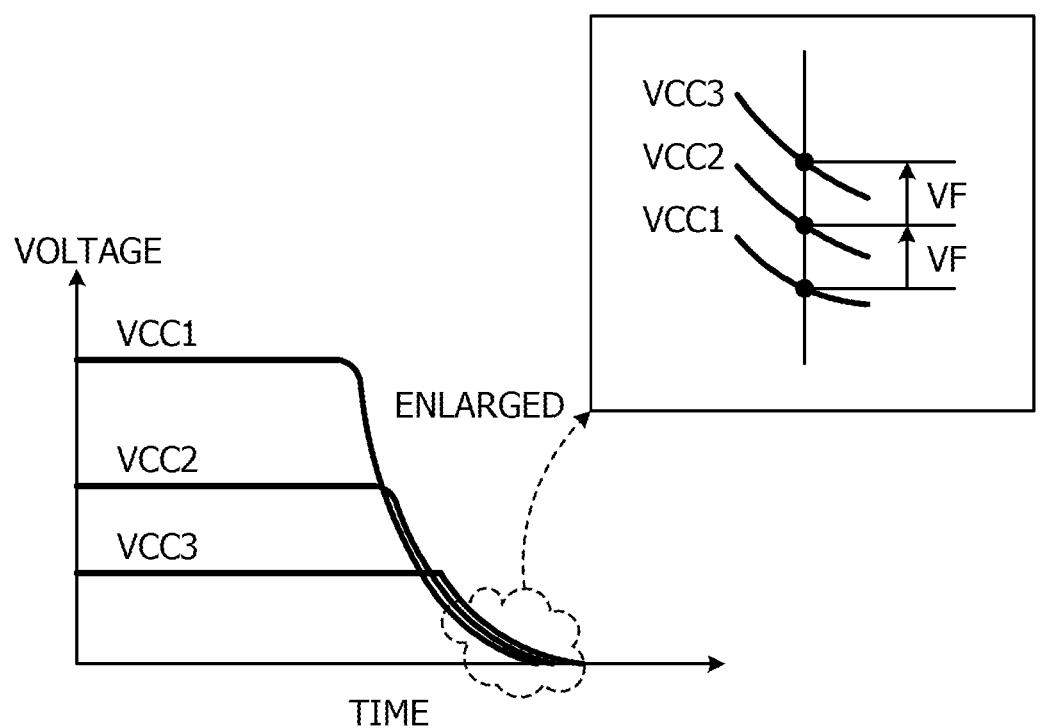
FIG. 4 is a diagram illustrating exemplary operation of a power supply device according to a comparative mode.

FIG. 4 is a diagram illustrating a discharge operation by the discharge circuit 5 in the power supply device 100 illustrated in FIG. 3. In a steady state, the voltage VCC3 of the output line 9c is smaller than the voltage VCC2 of the output line 9b, and the voltage VCC2 of the output line 9b is smaller than the voltage VCC1 of the output line 9a. VF represents a forward voltage of the diodes 2a and 2b. When the discharge by the discharge circuit 5 starts, the charge of the capacitor 7a is discharged to the discharge circuit 5, and VCC1 drops. When VCC1 becomes equal to or lower than (VCC2-VF), the charge of the capacitor 7b starts to be discharged to the discharge circuit 5 via the diode 2a, and VCC2 starts to decrease. When VCC2 becomes equal to or lower than (VCC3-VF), the charge of the capacitor 7c starts to be discharged to the discharge circuit 5 via the diode 2b and the diode 2a, and VCC3 starts to decrease.

However, as illustrated in FIG. 4, "VCC1>VCC2>VCC3" is satisfied at a start stage of a power-off sequence, whereas "VCC1<VCC2<VCC3" is satisfied at an end stage of the power-off sequence. For example, as the power-off sequence progresses, the magnitude relationship of VCC1, VCC2, and VCC3 is reversed. When the magnitude relationship of VCC1, VCC2, and VCC3 is reversed, a logic error, latch-up, failure, or the like of the loads 8a, 8b, and 8c may occur depending on the specifications of the loads 8a, 8b, and 8c.

Figure 5:
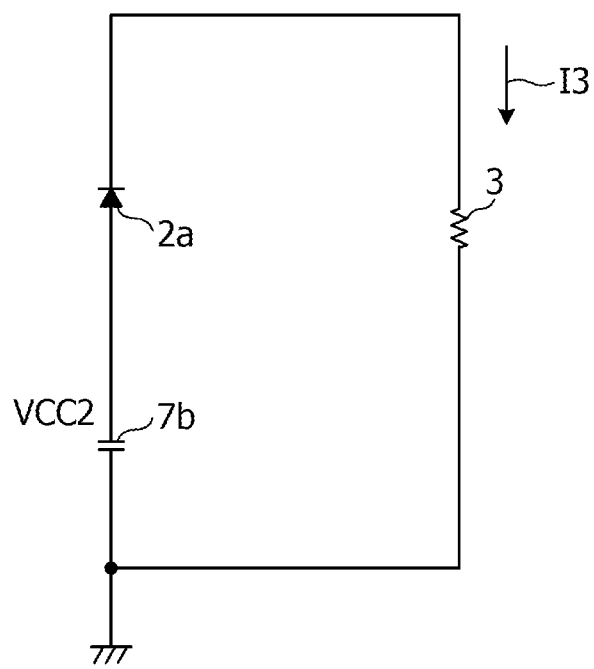
FIG. 5 is an equivalent circuit diagram illustrating discharge operation of a power supply device according to a comparative mode.
Figure 6:
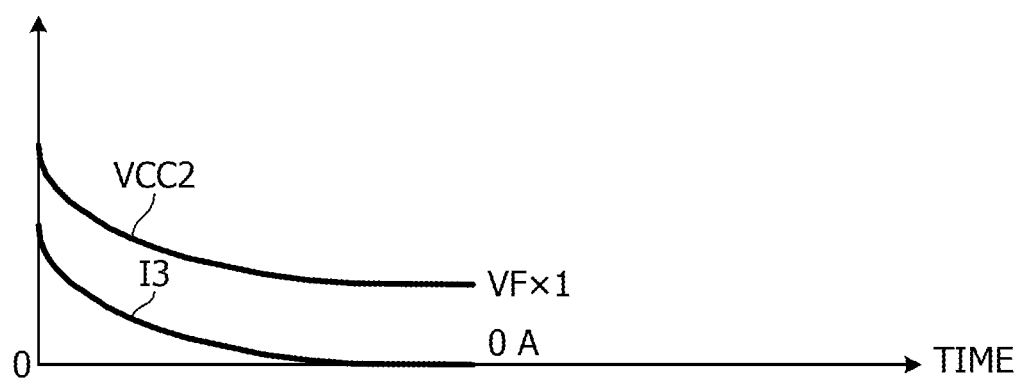
FIG. 6 is a diagram illustrating a voltage and a current during a discharge operation of a power supply device according to a comparative mode.
Figure 7:
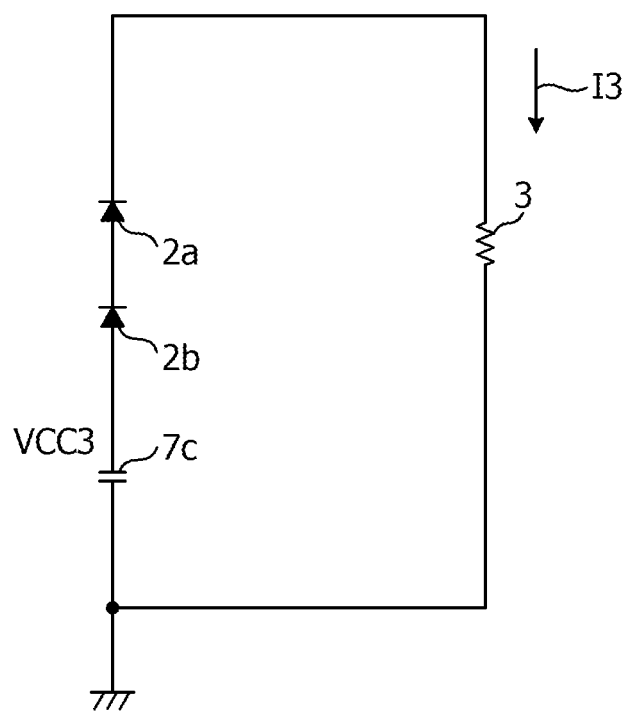
FIG. 7 is an equivalent circuit diagram illustrating discharge operation of a power supply device according to a comparative mode.
Figure 8:
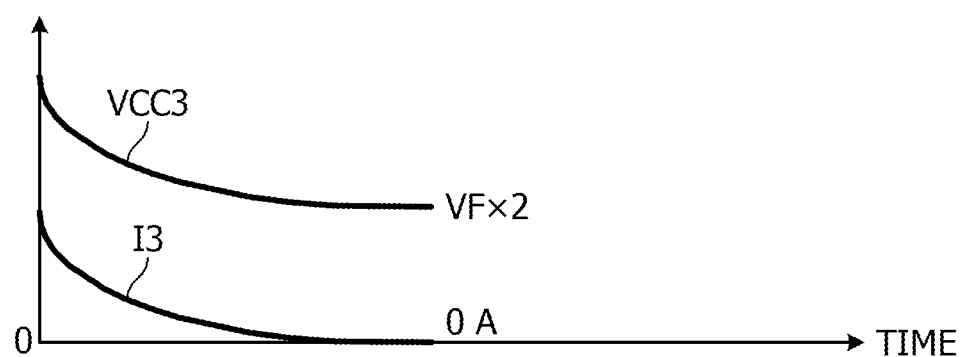
FIG. 8 is a diagram illustrating a voltage and a current during a discharge operation of a power supply device according to a comparative mode.

Furthermore, as illustrated in FIGS. 5 and 6, a discharge current 13 flowing from the capacitor 7b to the current limiting resistor 3 via the diode 2a is cut off when the voltage VCC2 of the output line 9b (capacitor 7b) drops to the forward voltage VF of the diode 2a. As illustrated in FIGS. 7 and 8, the discharge current 13 flowing from the capacitor 7c to the current limiting resistor 3 via the diodes 2b and 2a is cut off when the voltage VCC3 of the output line 9c (capacitor 7c) drops to the sum of the forward voltages (2×VF) of the diodes 2b and 2a. For example, in a configuration in which diodes are connected in series as in the power supply device 100 according to the comparative mode, the discharge cutoff voltage increases as the number of diodes through which the discharge current passes increases. Therefore, the capacitor connected to the output line having a lower voltage has a larger number of diodes through which the discharge current passes so that the forward voltage of the diodes accumulates, whereby it becomes difficult to discharge.

Figure 2:
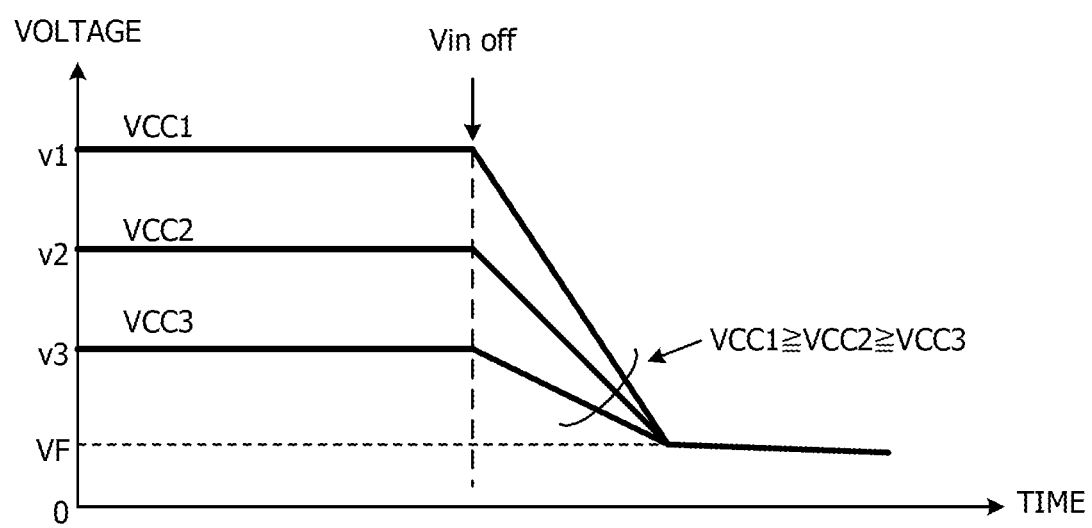
FIG. 2 is a diagram illustrating exemplary operation of a power supply device according to an embodiment.

Meanwhile, in the power supply device 101 according to the first embodiment illustrated in FIG. 1, the plurality of output lines 31, 32, and 33 are connected to the discharge resistor R1 via the diode-OR circuit including the diodes D1, D2, and D3. Thus, as illustrated in FIG. 2, any discharge current flowing from the capacitors C1, C2, and C3 to the discharge resistor R1 flows until VCC1, VCC2, and VCC3 drop to the forward voltage VF. Therefore, the charges accumulated in each of the diode capacitors C1, C2, and C3 are easily discharged.

Furthermore, since the plurality of output lines 31, 32, and 33 are connected to the discharge resistor R1 via the diode-OR circuit including the diodes D1, D2, and D3, as illustrated in FIG. 2, the magnitude relationship of VCC1, VCC2, and VCC3 is not reversed even when the power-off sequence progresses. For example, when the power-off sequence starts due to the interruption of the input voltage Vin, VCC1, VCC2, and VCC3 having voltage values of v1, v2, and v3 in the steady state, respectively, drop to the discharge cutoff voltage (forward voltage VF) without the magnitude relationship being reversed. Therefore, it becomes possible to reduce the possibility that the logic error, latch-up, failure, or the like of the load 51 occurs.

Figure 9:
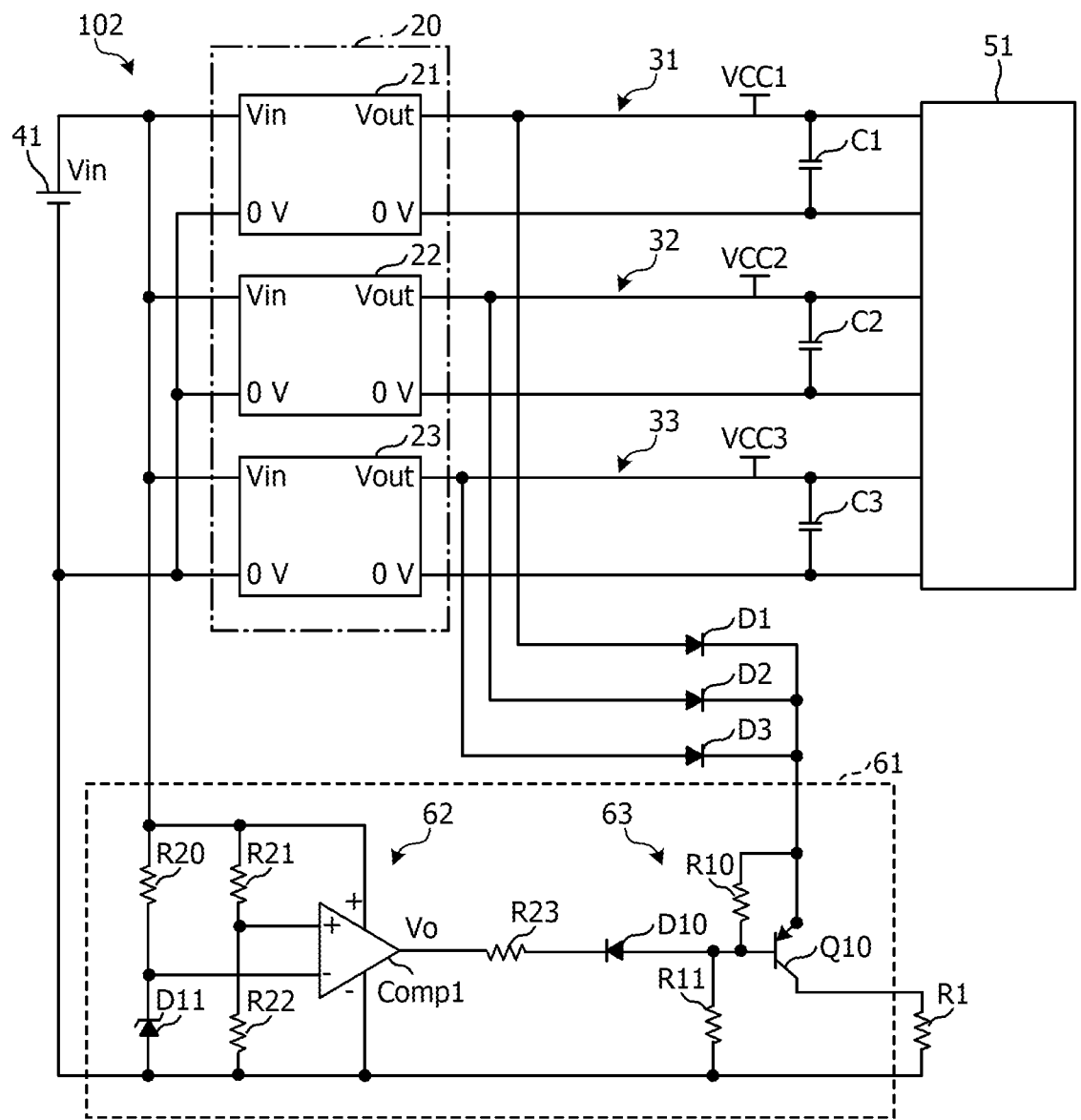
FIG. 9 is a diagram illustrating an exemplary configuration of a power supply device according to a second embodiment.

FIG. 9 is a diagram illustrating an exemplary configuration of a power supply device according to a second embodiment. In the second embodiment, descriptions of configurations and effects similar to those in the first embodiment will be omitted by referring to the descriptions above. A power supply device 102 illustrated in FIG. 9 is different from the power supply device 101 according to the first embodiment in that a control circuit 61 is included.

The control circuit 61 controls current flowing a discharge resistor R1 depending on the magnitude of an input voltage Vin. Thus, it becomes possible to adjust the power consumption due to the current flowing through the discharge resistor R1. For example, in a case where the input voltage Vin is high, the control circuit 61 suppresses, using a switching element Q10, the current flowing through the discharge resistor R1 as compared with a case where the input voltage Vin is low. Suppressing may also include the meaning of stopping. Thus, it becomes possible to suppress an increase in the power consumption due to the current flowing through the discharge resistor R1 in a state where the steady input voltage Vin is supplied. For example, when the control circuit 61 detects a decrease in the input voltage Vin, it uses the switching element Q10 to permit the current to flow through the discharge resistor R1. Thus, when a power-off sequence starts due to interruption of the input voltage Vin, it is possible to discharge charges of capacitors C1, C2, and C3 to the discharge resistor R1 to reduce VCC1, VCC2, and VCC3.

The control circuit 61 includes, for example, a monitoring circuit 62 that monitors the input voltage Vin, and a selection circuit 63 that selects whether or not to pass the current through the discharge resistor R1 depending on a monitoring result of the input voltage Vin by the monitoring circuit 62. The monitoring circuit 62 includes, for example, resistors R20, R21, and R22, a Zener diode D11, and a comparator Comp1. The selection circuit 63 includes, for example, resistors R23, R10, and R11, a diode D10, and a switching element Q10.

The monitoring circuit 62 makes a comparison to determine whether or not the input voltage Vin is higher than a reference voltage Vr using the comparator Comp1. A threshold voltage Vth corresponding to the reference voltage Vr is generated by the resistor R20 and the Zener diode D11. With the input voltage Vin subject to voltage dividing by the resistor R21 and the resistor R22, a detection voltage of the input voltage Vin is generated. The monitoring circuit 62 sets a level of a determination voltage Vo output from the comparator Comp1 to a high level in a case where the input voltage Vin is higher than the reference voltage Vr, and sets the level of the determination voltage Vo to a low level in a case where the input voltage Vin is lower than the reference voltage Vr.

The selection circuit 63 switches the switching element Q10 on or off depending on the level of the determination voltage Vo. The selection circuit 63 turns off the switching element Q10 when the level of the determination voltage Vo is the high level. Thus, it becomes possible to suppress the power consumption of the discharge resistor R1 when the voltage output of the converters 21, 22, and 23 is on. On the other hand, the selection circuit 63 turns on the switching element Q10 when the level of the determination voltage Vo is the low level. Thus, it becomes possible to pass the discharge current from the capacitors C1, C2, and C3 through the discharge resistor R1 when the voltage output of the converters 21, 22, and 23 is off.

FIG. 9 exemplifies a case where the switching element Q10 is a PNP bipolar transistor. However, the switching element Q10 may be another element such as, for example, a semiconductor element such as a Metal Oxide Semiconductor Field Effect Transistor (MOSFET). The diode D10 is for pressure resistance protection of the switching element Q10. The resistor R23 is for output current adjustment of the switching element Q10.

FIG. 10 is a diagram illustrating exemplary operation of the power supply device according to the second embodiment. The exemplary operation illustrated in FIG. 10 has the following conditions.

Range of Input Voltage Vin: 8 V to 12 V
Reference Voltage Vr: 7.9 V
Q10:—(Reference: Current amplification factor Fife is 100 or more)
R10, R11: 10 kΩ
D13: 7.9 V
R20: 10 kΩ
R21: 100 Ω
R22: 10 kΩ
R23:—(Reference: 100Ω)

The voltage of a non-inversion input terminal V+ of the comparator Comp1 is determined by "V+=Vin/(R21+R22)× R22". Since the voltage of an inverting input terminal V− of the comparator Comp1 uses the Zener diode D11 having a Zener voltage of 7.9 V, it is clamped at a fixed value of 7.9 V when the input voltage Vin is equal to or higher than 7.9 V. When the input voltage Vin is lower than 7.9 V, the voltage of the inverting input terminal V− is the voltage same as that of the input voltage Vin. The determination voltage Vo output from the comparator Comp1 is the high level in a case of V+>V−, and is the low level in a case of V−>V+.

Although the embodiments have been described above, the technique of the present disclosure is not limited to the embodiments described above. Various modifications and improvements such as combination and replacement with some or all of other embodiments may be allowed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power supply device comprising:
a power supply circuit configured to output different voltages to a plurality of output lines;
a plurality of capacitors provided in correspondence with the plurality of output lines, one end of each of the plurality of capacitors being coupled to a corresponding output line of the plurality of output lines and an other end thereof being coupled to a ground potential;
a plurality of diodes provided in correspondence with the plurality of output lines, anodes of the plurality of diodes being coupled to the corresponding output lines and cathodes thereof being commonly coupled;
a discharge resistor coupled to the cathodes of the plurality of diodes; and
a control circuit configured to control current that flows through the discharge resistor according to magnitude of the input voltage,
wherein the power supply circuit includes a plurality of voltage generation circuits that generate a plurality of the voltages from a common input voltage, and
wherein in a case where the input voltage is higher than a predetermined value, the control circuit suppresses the current as compared with a case where the input voltage is lower than the predetermined value.

2. The power supply device according to claim 1, wherein the voltage generation circuit includes a DC-DC conversion circuit.

3. The power supply device according to claim 1, wherein the control circuit includes a switching element coupled in series with the discharge resistor and controls the current by using the switching element.

4. A power supply device, comprising:
a power supply circuit configured to output different voltages to a plurality of output lines;
a plurality of capacitors provided in correspondence with the plurality of output lines, one end of each of the plurality of capacitors being coupled to a corresponding output line of the plurality of output lines and an other end thereof being coupled to a ground potential;
a plurality of diodes provided in correspondence with the plurality of output lines, anodes of the plurality of diodes being coupled to the corresponding output lines and cathodes thereof being commonly coupled; and
a discharge resistor coupled to the cathodes of the plurality of diodes,
wherein the power supply circuit includes a plurality of voltage generation circuits that generate a plurality of the voltages from a common input voltage,
wherein a magnitude of each of the plurality of voltages relative to each other during a steady state of power supply by the power supply circuit sets a magnitude relationship of the plurality of voltages, and
wherein the plurality of voltages are lowered to a discharge cutoff voltage without reversing the magnitude relationship of the plurality of voltages when the input voltage is interrupted.

5. A power supply device comprising:
a power supply circuit configured to output different voltages to a plurality of output lines;
a plurality of capacitors provided in correspondence with the plurality of output lines, one end of each of the plurality of capacitors being coupled to a corresponding output line of the plurality of output lines and an other end thereof being coupled to a ground potential;
a plurality of diodes provided in correspondence with the plurality of output lines, anodes of the plurality of diodes being coupled to the corresponding output lines and cathodes thereof being commonly coupled;
a discharge resistor coupled to the cathodes of the plurality of diodes; and
a control circuit configured to control current that flows through the discharge resistor according to magnitude of the input voltage,
wherein the power supply circuit includes a plurality of voltage generation circuits that generate a plurality of the voltages from a common input voltage,
wherein the control circuit permits the current to flow through the discharge resistor when a decrease of the input voltage is detected.

6. The power supply device according to claim 5, wherein the control circuit includes a switching element coupled in series with the discharge resistor and controls the current by using the switching element.

* * * * *